Jan. 29, 1957  A. F. GALLISTEL  2,779,308
PIPE LINE MILKING SYSTEM AND VALVE THEREFOR
Filed May 8, 1953  3 Sheets-Sheet 2
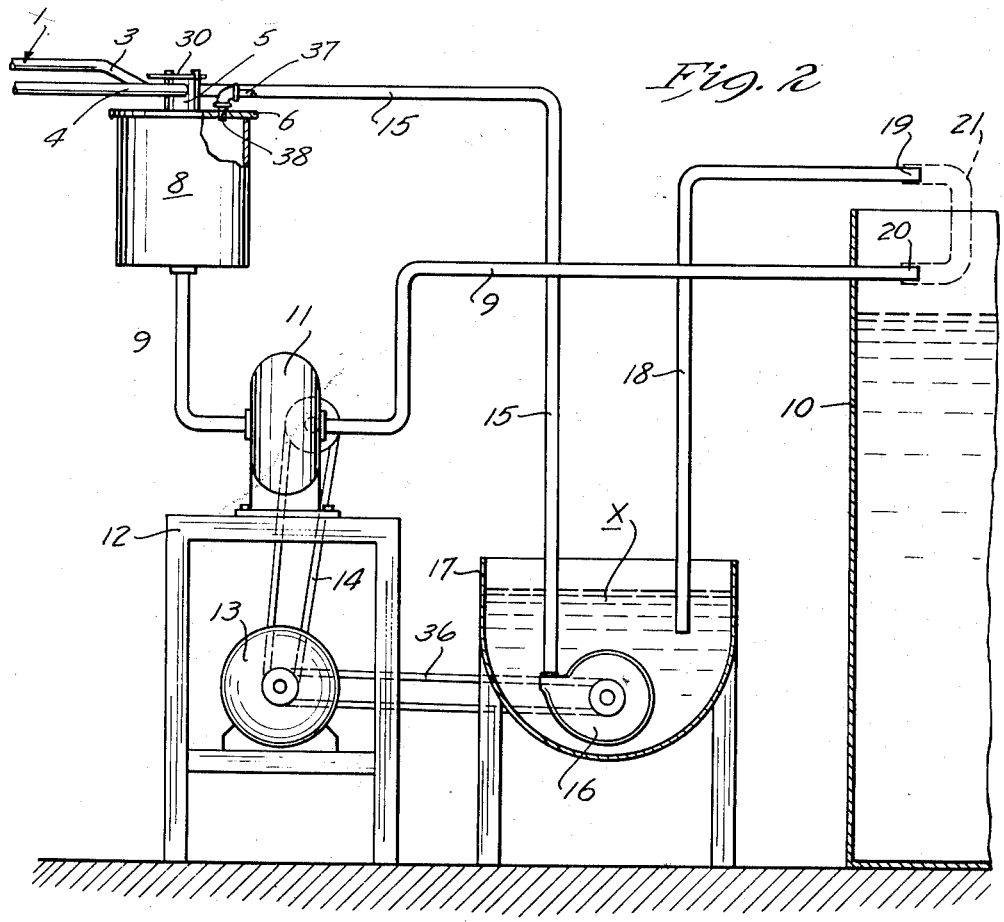
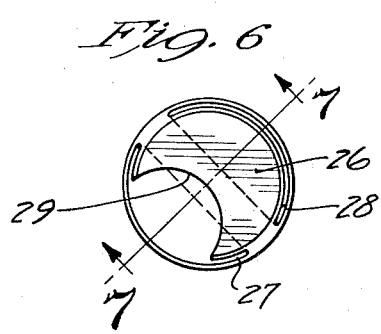
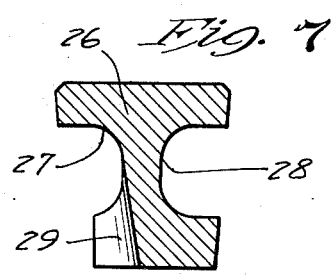
INVENTOR.
Albert F. Gallistel
BY
ATTORNEYS Jan. 29, 1957  A. F. GALLISTEL  2,779,308
PIPE LINE MILKING SYSTEM AND VALVE THEREFOR
Filed May 8, 1953  3 Sheets-Sheet 3
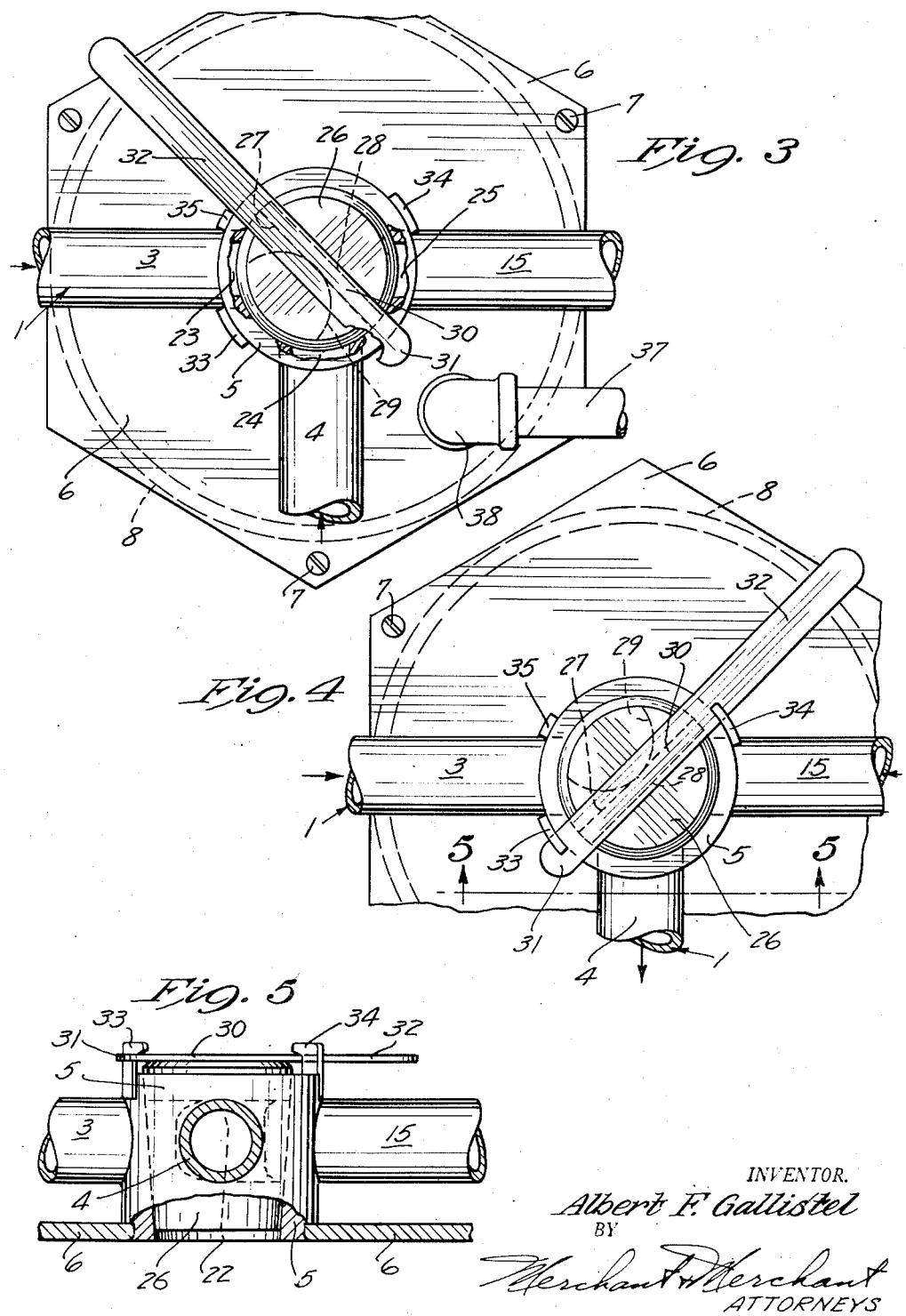
INVENTOR.
Albert F. Gallistel
BY
Merchant & Merchant
ATTORNEYS

United States Patent Office 2,779,308
Patented Jan. 29, 1957

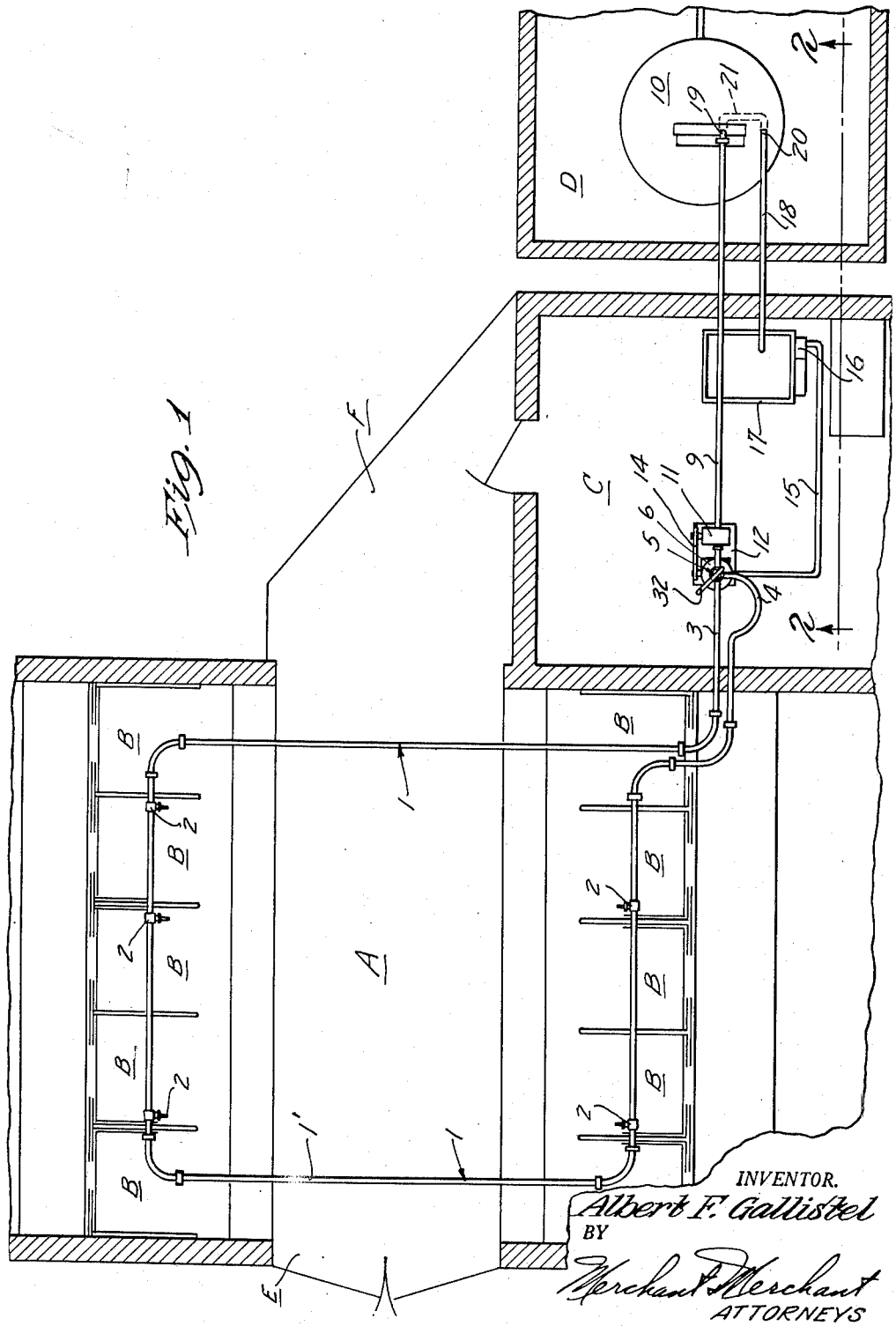

2,779,308
PIPE LINE MILKING SYSTEM AND VALVE THEREFOR

Albert F. Gallistel, Minneapolis, Minn., assignor to Perfection Manufacturing Corporation, Minneapolis, Minn., a corporation of Minnesota Application May 8, 1953, Serial No. 353,780

1 Claim. (Cl. 119—14.18)

My invention relates generally to milking equipment and more specifically to pipe line milking systems in dairy barns and the like.

Pipe line milking systems generally consist of a milk collecting conduit extending about a given area such as a dairy barn or the like in close proximity to the stalls thereof, hose nipples, stall cocks or valves to which milk delivery tubes are attached, a cooling or storage tank, and pump means for drawing the milk through the tubes and milk collecting conduit to the cooling tank. The milk-receiving tubes are usually connected by means of a distributing head to a plurality of teat cups. Systems of this type must be cleaned and disinfected at frequent intervals, such cleaning and disinfecting being accomplished by the introduction of suitable fluid under pressure to the various conduits, valves, and pumps comprising these systems. Heretofore, this cleaning and disinfecting operation has been cumbersome and inefficient in that some portions of the apparatus had to be disconnected so that access could be had by the cleaning fluid to all portions of the system. The primary object of my invention is, therefore, the provision of a novel pipe line milking system and valve therefor which may be cleaned and disinfected throughout its entire length without dismantling any of the equipment used in the milking operation.

Another object of my invention is the provision of novel valve structure by means of which a pipe line milking system may be rendered operative to gather milk from a plurality of stalls and which may be readily set to permit cleaning and disinfecting fluid to be run through the system.

Another object of my invention is the provision of valve structure, as set forth, which in one position of the parts thereof may be instantly dismantled for cleaning or inspection and which in another position of the parts is locked against disassembly.

Generally stated, the invention consists of the novel devices, combinations of devices, and arrangement of parts hereinafter described and defined in the claim.

In the accompanying drawings, which illustrate the invention, like characters indicate like parts throughout the several views.

Referring to the drawings:

Fig. 1 is a diagrammatic plan of a dairy barn incorporating my improved pipe line milking system, some parts broken away and some parts shown in section;

Fig. 2 is a fragmentary view partly in vertical section and partly in side elevation taken substantially on the line 2—2 of Fig. 1;

Fig. 3 is a fragmentary view in plan of the valve structure of my invention on an enlarged scale;

Fig. 4 is a view corresponding to Fig. 3 but showing a different position of some of the parts;

Fig. 5 is a fragmentary detail taken substantially on the line 5—5 of Fig. 4;

Fig. 6 is a bottom plan view of the valve plug of my improved valve structure; and Fig. 7 is a cross-sectional detail taken on the line 7—7 of Fig. 6.

A conventional dairy barn is illustrated in Fig. 1 as comprising a cattle room A having a plurality of stalls B therein, a pump room C, and a cooling or storage room D. The cattle room A has an entrance E at one end for cattle and at its other end opens out onto a loading dock or platform F.

A milk collecting conduit 1 extends about the interior of the cattle room A in close proximity to the stalls B thereof and has interposed therein a plurality of conventional hose nipples stall cocks, or valves 2 that are adapted to be coupled to flexible tubes leading to conventional teat cups by means of distributing heads of conventional design. The teat cups, distributing heads, and flexible tubes leading to the stall cocks 2 do not in themselves comprise the instant invention and are not shown. The stall cocks 2 likewise in themselves form no part of the invention and are shown only diagrammatically. The opposite ends 3 and 4 of the milk collecting conduit 1 extend into the pump room C and are connected to spaced passages in a valve body 5. Preferably, the intermediate portion 1' of the milk collecting conduit 1 is at a higher level than the ends 3 and 4 thereof so that the conduit 1 may be easily drained and so that the fluid does not lie in any part of the system between milking operations.

As shown in Figs. 1 to 5 inclusive, the valve body 5 is rigidly secured to a plate-like cover element 6 that is detachably secured by screws or the like 7 to a container 8 which defines an air separation chamber and forms the inlet end of a discharge conduit 9 which extends to a cooling tank 10 located in the cooling or storage chamber D. A pump 11 of any suitable design is interposed in the discharge conduit 9 and is mounted on a supporting structure 12. A motor 13 drives the pump 11 by suitable means including an endless belt 14.

Conduit means in the nature of a pipe or the like 15 has one end connected to the valve body 5 in circumferentially spaced relationship to the milk collecting conduit ends 3 and 4 and has its other end connected to the discharge of a pump 16 communicating with the interior of a fluid reservoir 17 which contains suitable cleaning and disinfecting liquid X. With particular reference to Figs. 1 and 2, it will be seen that a return conduit 18 has its lower end communicating with the reservoir 17 while its upper end 19 is located in closely spaced relationship to the delivery end 20 of the discharge conduit 9. A relatively short generally U-shaped removable coupling shown by dotted lines in Figs. 1 and 2 and indicated at 21 is adapted to be fitted over the ends 19 and 20 of the conduits 18 and 9 respectively for a purpose which will hereinafter become apparent. The valve body 5 is generally cylindrical and is provided with a central conical bore 22 extending therethrough to the interior of the container 8. It will be seen, by reference to Fig. 5, that the bore 22 is of smaller diameter at its lower end than at its upper end. The valve body 5 is provided with circumferentially spaced passages 23, 24, and 25 which communicate with the bore 22 and extend transversely thereof to the exterior of the valve body 5 and communicate with their respective conduit ends 3 and 4 and pipe 15. A conical valve plug 26 is rotatably mounted in the bore 22 and has a conical surface corresponding to said bore whereby a snug fit is obtained therebetween. The plug 26 is formed to provide a pair of transverse ports or passages 27 and 28 and a generally axially extending port or passage 29 extending from the port 27 to the lower diametrically reduced end of the plug 26, see particularly Figs. 6 and 7.

The transverse ports 27 and 28 are positioned to register selectively with one or more of the passages in the valve body 5 upon rotation of the plug 26 in the bore 22. With reference to Figs. 3 and 4, it will be seen that the transverse port 27 is adapted to register with one or both of the passages 23 and 24 whereas the port 28 is adapted to register with the passages 24 and 25 or the passage 25 alone. A handle 30 extends diametrically of the valve plug 26 and is welded or otherwise rigidly secured to the upper enlarged end thereof. The handle 30 is preferably in the form of a flat resilient metal bar and projects radially outwardly in opposite directions from the plug 26, as indicated at 31 and 32, the latter extending sufficiently to provide a portion that may be grasped by the operator for ease in rotating the plug 26. Rotary movement of the plug 26 and handle 30 in one direction is limited by engagement of the projecting end portions 31 and 32 of the handle 30 with a pair of circumferentially spaced hooks 33 and 34 respectively. Said hooks extend axially outwardly from the valve body 5, see Fig. 5, and overlie the engaged portions of the handle 30 to prevent axial movement of the plug 26 upwardly from the valve body 5. The hooks 33 and 34 have wedge-acting surfaces 33' and 34' respectively which exert a camming action on the portions of the resilient handle 30 engaged thereby to force the plug 26 into leak proof seating engagement with the valve body. Obviously, when the handle 30 and plug 26 are rotated out of engagement of the handle portions 31 and 32 with the hooks 33 and 34, the plug 26 may be lifted out of the bore 22 for purposes of cleaning or otherwise, if desired. Rotary movement of the plug 26 and handle 30 is limited in the opposite direction by engagement of the projected portion 32 of the handle 30 with a stop lug or ear 35 projecting upwardly from the valve body 5. It will be noted, by reference to Figs. 3 and 4, that the stop element 35 is so spaced from the hooks 33 and 34 that rotary movement is permitted the valve plug 26 to an extent of substantially ninety circular degrees. It should also be noted that the handle 30 is so orientated relative to the ports 27 and 28 that when the handle is engaged by the stop lug 35, as in Fig. 3, the port 27 is in register with both passages 23 and 24 so that the opposite ends 3 and 4 of the milk collecting conduit 1 communicate with the interior of the container 8 through the ports 27 and 29. In this position of the plug 26, the port 28 is in register with the passage 25 only. Furthermore, when the valve plug 26 is moved to its position of Fig. 4, the connected ports 27 and 29 are in register with the passage 23 only whereas the port 28 is in register with both passages 24 and 25 in the valve body 5 thereby permitting flow of liquid from the pipe 15 to the conduit 1 through the end portion 4 thereof. In this position of the valve plug 26, as above indicated, the plug is incapable of being removed from seating engagement with the bore 22.

Normally, the pump 11 is utilized only for the delivering of milk from the separation chamber 8 to the cooling tank 10. The chamber 8 and the pipe line 1 are placed under partial vacuum by means for a conventional vacuum pump, not shown, but which, together with suitable valves, not shown, may be assumed to be connected to the chamber 8 by a vacuum line 37 communicating with the air separation chamber through a fitting 38 in the cover plate 6.

During the milking operation, the valve plug 26 is positioned as indicated in Fig. 3, coupling tube 21 disengaged from the delivery end 20 of the discharge conduit 9, and a partial vacuum created in the container 8. The ports 27 and 29 being in communication with the end portions 3 and 4 of the milk collecting conduit 1, said milk collecting conduit is also under partial vacuum to cause a flow of milk from the several stalls so that the milk flows into the container 8 from whence it is pumped through the discharge conduit 9 by the pump 11 to the cooling tank 10. During this time, the pump 16 which is driven from the motor 13 by means of a belt or the like 36 is rendered ineffective by reason of the fact that the port 28 of the valve plug 26 is in register only with the passage 25 in the valve body 5. The container 8 being under subatmospheric pressure, there is no danger of the valve plug 26 becoming unseated from the bore 22. In fact, the plug is pulled into snug fit with the body 5 and leakage of fluid from the pipe 15 to the container 8 is effectively prevented.

After the milking operation is completed, the vacuum pump is rendered inoperative, the coupling 21 is fitted to the delivery end 20 of the discharge conduit 9 and the end portion 19 of the return conduit 18 and the valve plug 26 rotated to its position of Fig. 4. The disinfectant or flushing fluid X is then pumped from the reservoir 17 through the pipe 15 to the valve 5 where it passes through the port 28 to the end portion 4 of the milk collecting conduit 1. From thence, it passes completely through the conduit 1 to the ports 27 and 29 in the valve plug 26, into the container 8, through the discharge conduit 9 and pump 11, the coupling 21 and the return conduit 18, and back to the reservoir 17. Obviously the several stall cocks or valves 2 are closed for the flushing operation, the equipment coupled thereto, not shown, being cleaned separately in the customary manner. This arrangement provides for effective rinsing and disinfecting of all parts of the system including the entire length of the milk line with a minimum loss of time and without the necessity of dismantling any portion of the permanently installed apparatus involved. If desired, a coupling manifold, not shown, may be interposed in the return conduit 18 and said teat cups, distributing heads, and flexible tubes connected thereto so that they too might be cleaned and rinsed simultaneously with the pipe line system. During the flushing operation, the handle 30 is engaged by the hooks 33 and 34 so that there is no danger of the pressure of cleaning fluid in the pipe 15 causing the valve plug 26 to be lifted out of seating engagement with the bore 22.

My invention has been thoroughly tested and found to be completely satisfactory for the accomplishment of the objectives set forth; and, while I have shown and described a preferred embodiment of my improved pipe line milking system and valve therefore, it will be understood that the same is capable of modification without departure from the spirit and scope of the invention, as defined in the claim.

What I claim is:

In a pipe line milking system for a dairy building having plurality of stalls therein, a milk collecting conduit adapted to pass in close proximity to said stalls and encompass a given area in said building, said conduit sloping downwardly in opposite directions from a high point at its intermediate portion to its opposite ends, valve means in said conduit on one side of said high point for collecting milk from said stalls, a valve structure including a valve body having fluid passages therein and a cooperating ported valve element mounted in said body for movements causing communication between given ports in said element and given passages in said body, opposite ends of said milk collecting conduit being connected to different passages in said valve body, a discharge conduit connected to one of said valve body passages for delivery of milk therefrom to a cooling tank, a pump interposed in said discharge conduit, a reservoir for flushing liquid, a second pump, conduit means connecting said second pump to said reservoir and to a passage in said valve body, and a return conduit to said reservoir adapted to be coupled to the delivery end of said discharge conduit, said valve element being movable between a milk delivery position, wherein both ends of said milk collecting conduits are operatively coupled to said cooling tank through said first mentioned pump and said discharge conduit, and a flushing position wherein, when said return conduit is coupled to the delivery end of said discharge conduit, flushing liquid from said reservoir is caused to flow through all of said conduits and said valve structure responsive to operation of said second pump.

References Cited in the file of this patent

UNITED STATES PATENTS

| | | |
|---|---|---|
| 948,036 | Best | Feb. 1, 1910 |
| 1,393,387 | McCornack | Oct. 11, 1921 |
| 1,846,805 | Hapgood | Feb. 23, 1932 |
| 1,854,307 | Hapgood | Apr. 19, 1932 |
| 2,009,399 | Hapgood | July 30, 1935 |
| 2,030,513 | Hapgood | Feb. 11, 1936 |
| 2,558,628 | Redin | June 26, 1951 |